(12) United States Patent
Lee et al.

(10) Patent No.: US 12,318,057 B2
(45) Date of Patent: Jun. 3, 2025

(54) ROBOT CLEANER

(71) Applicant: LG ELECTRONICS INC., Seoul (KR)

(72) Inventors: Seungjin Lee, Seoul (KR); Hwang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 723 days.

(21) Appl. No.: 17/641,924

(22) PCT Filed: Oct. 2, 2019

(86) PCT No.: PCT/KR2019/012923
§ 371 (c)(1),
(2) Date: Mar. 10, 2022

(87) PCT Pub. No.: WO2021/066223
PCT Pub. Date: Apr. 8, 2021

(65) Prior Publication Data
US 2022/0330769 A1 Oct. 20, 2022

(51) Int. Cl.
*A47L 9/00* (2006.01)
*B60B 33/00* (2006.01)

(52) U.S. Cl.
CPC .......... *A47L 9/009* (2013.01); *B60B 33/0036* (2013.01); *A47L 2201/00* (2013.01)

(58) Field of Classification Search
CPC ....................... B60B 33/0036; B60B 2200/49
See application file for complete search history.

(56) References Cited

U.S. PATENT DOCUMENTS

| 10,259,260 B2* | 4/2019 | Kim | ................. B60B 15/18 |
| 10,314,454 B2* | 6/2019 | Kim | ................. A47L 9/009 |
| 2016/0081525 A1* | 3/2016 | Kim | ................. B60B 15/263 |
| | | | 15/340.1 |
| 2017/0245710 A1 | 8/2017 | Kim | |

FOREIGN PATENT DOCUMENTS

| EP | 3 117 753 | 1/2017 |
| JP | 2006-151346 | 6/2006 |
| JP | 2014-230714 | 12/2014 |
| KR | 10-1427391 | 8/2014 |
| KR | 10-2016-0035366 | 3/2016 |
| KR | 10-2016-0124484 | 10/2016 |
| KR | 10-2017-0100915 | 9/2017 |
| KR | 10-2017-0101873 | 9/2017 |

OTHER PUBLICATIONS

International Search Report issued in Application No. PCT/KR2019/012923 dated Jul. 1, 2020.
Korean Notice of Allowance dated Jan. 30, 2024 issued in Application No. 10-2022-7007220.
Korean Office Action issued in Application No. 10-2022-7007220 dated Nov. 27, 2023.

* cited by examiner

*Primary Examiner* — Kevin Hurley
*Assistant Examiner* — Hosam Shabara
(74) *Attorney, Agent, or Firm* — KED & ASSOCIATES

(57) ABSTRACT

The present disclosure relates to a robot cleaner, more particularly, to a robot cleaner that may be escaped from a trapped state by an escaping unit formed in an inner surface of a wheel, when a body of the robot cleaner is caught in a protrusion to put the robot cleaner in a trapped state where the robot cleaner cannot run during the running on the floor of a cleaning area.

15 Claims, 7 Drawing Sheets

[Fig. 1]
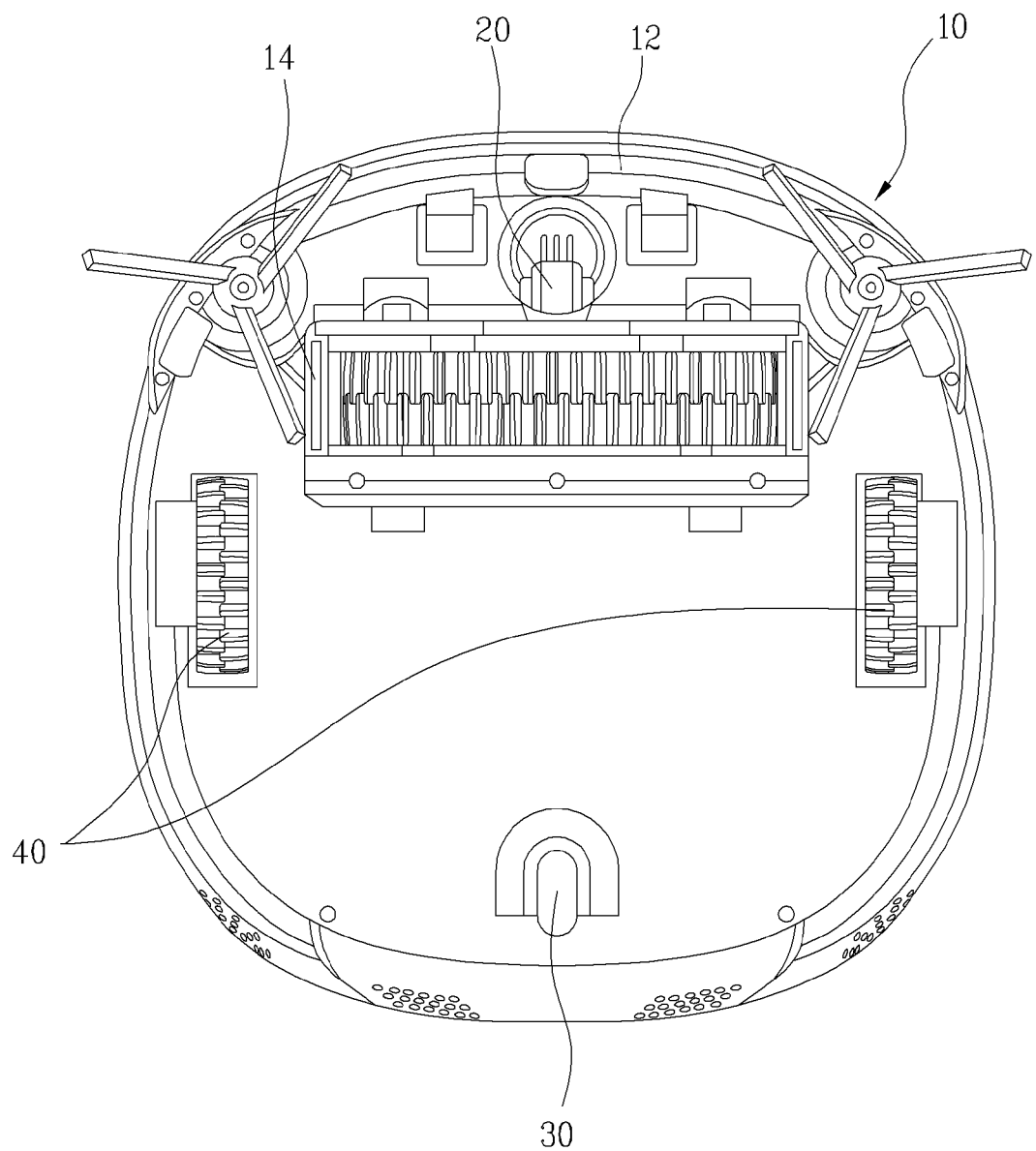

[Fig. 2]
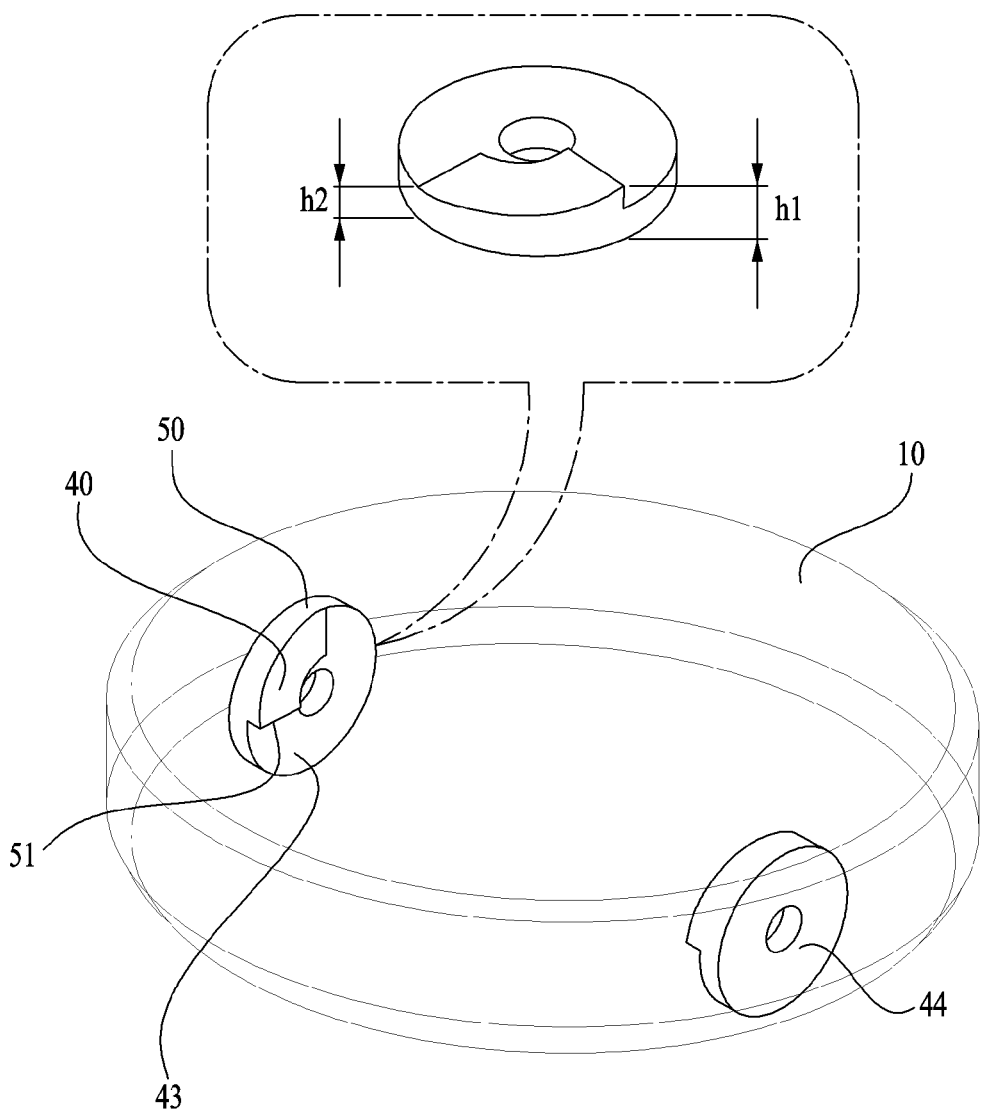

[Fig. 3]
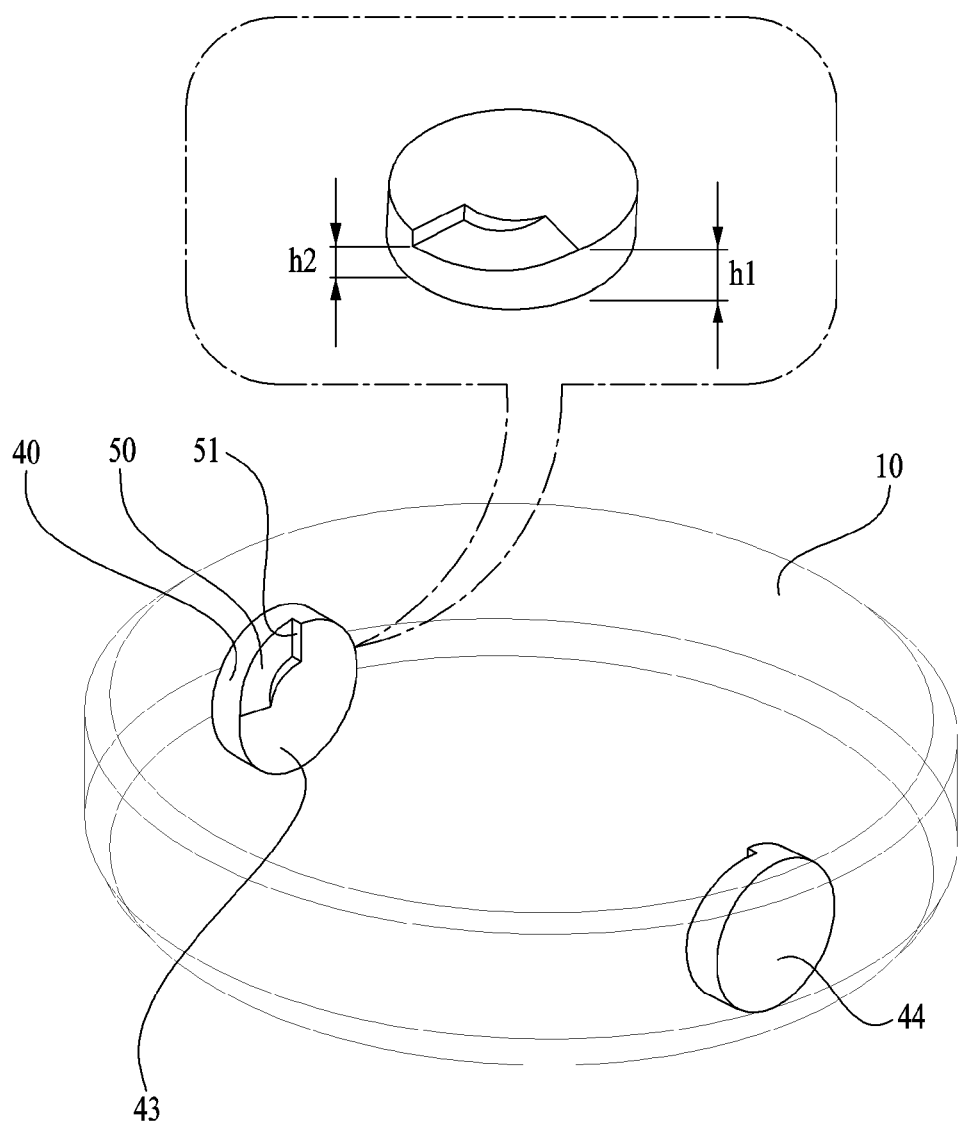

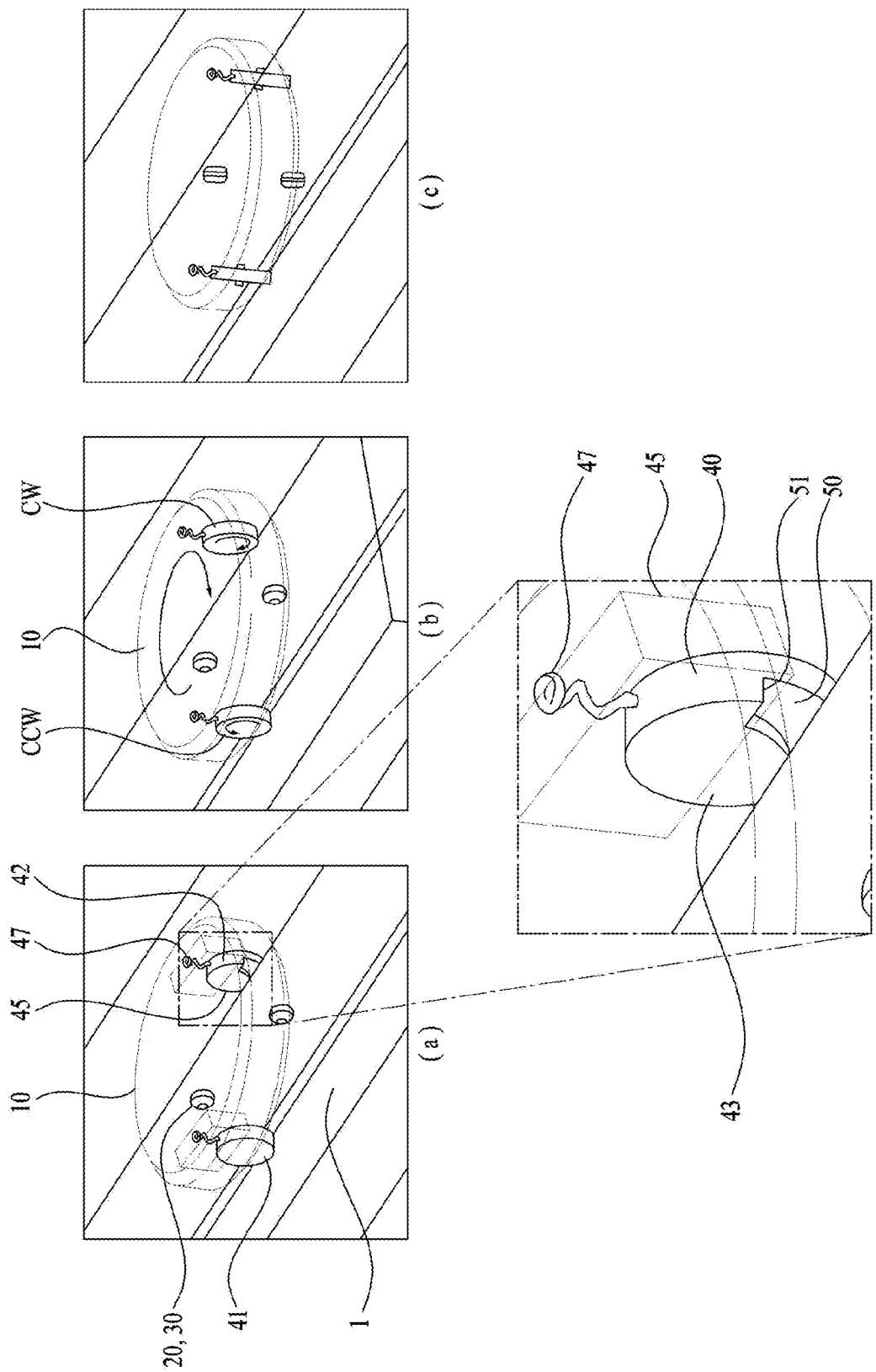
[FIG. 4]

[Fig. 5]
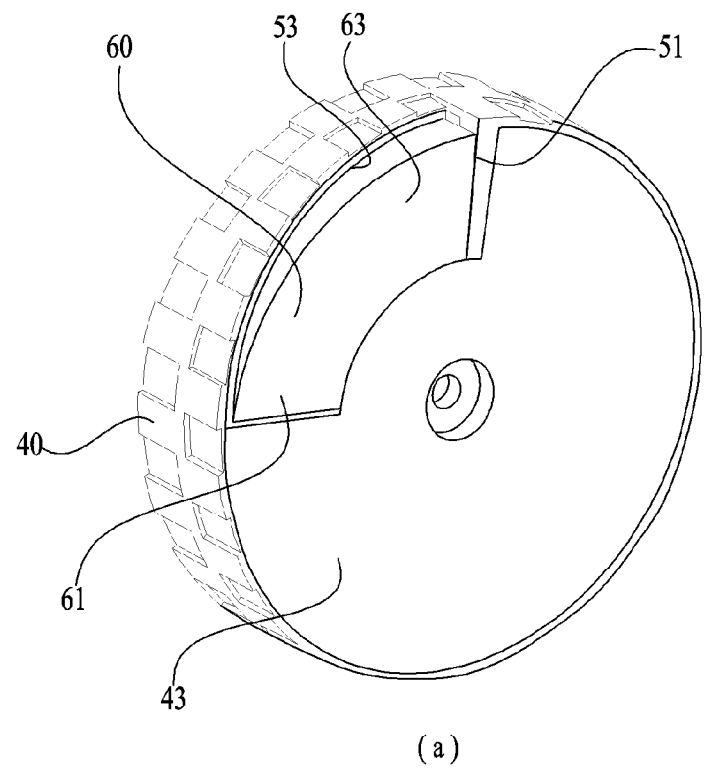
(a)
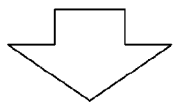
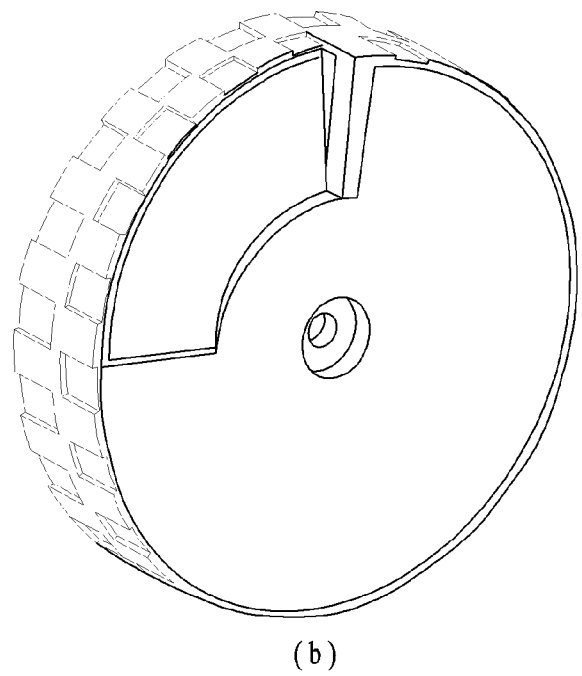
(b)

[Fig. 6]
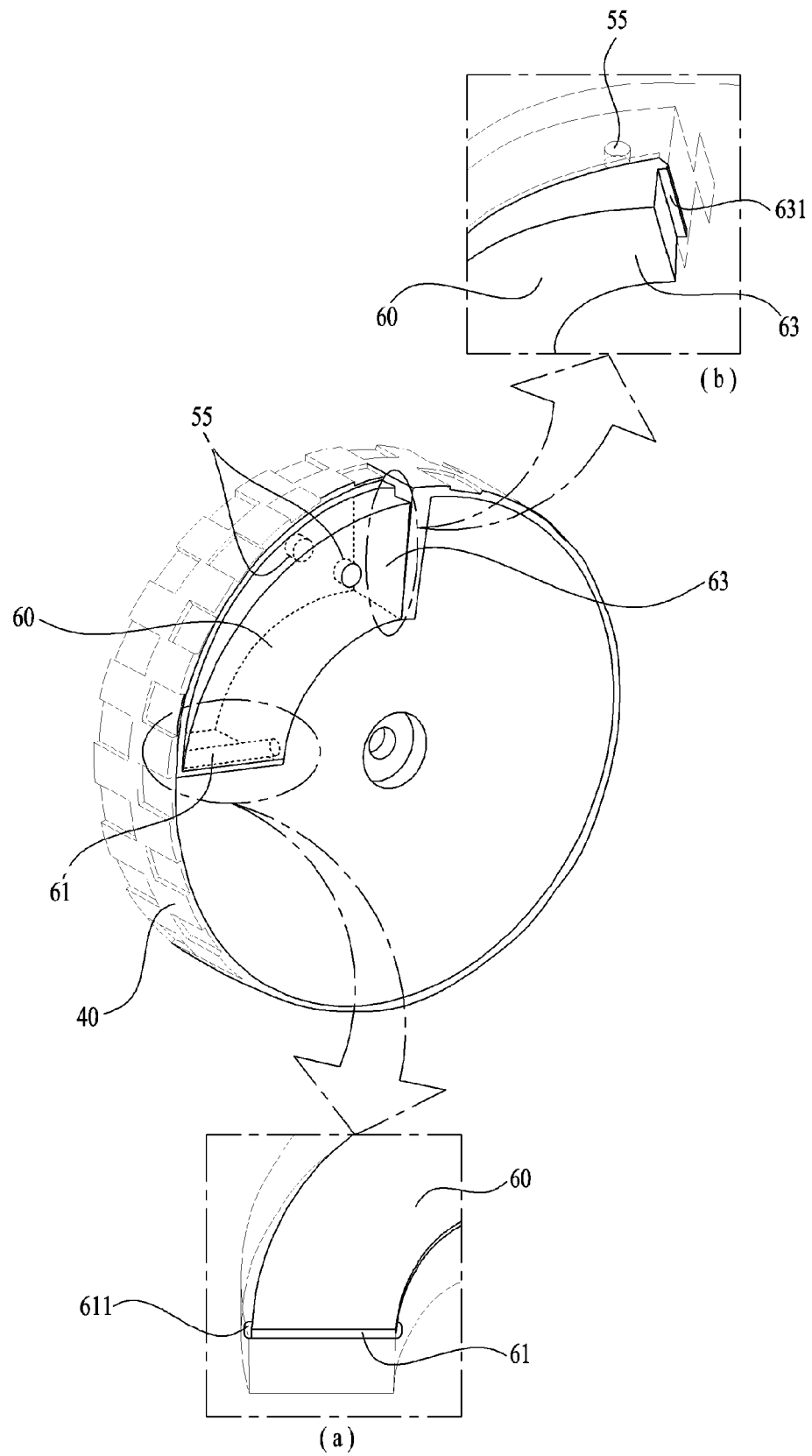

[Fig. 7]
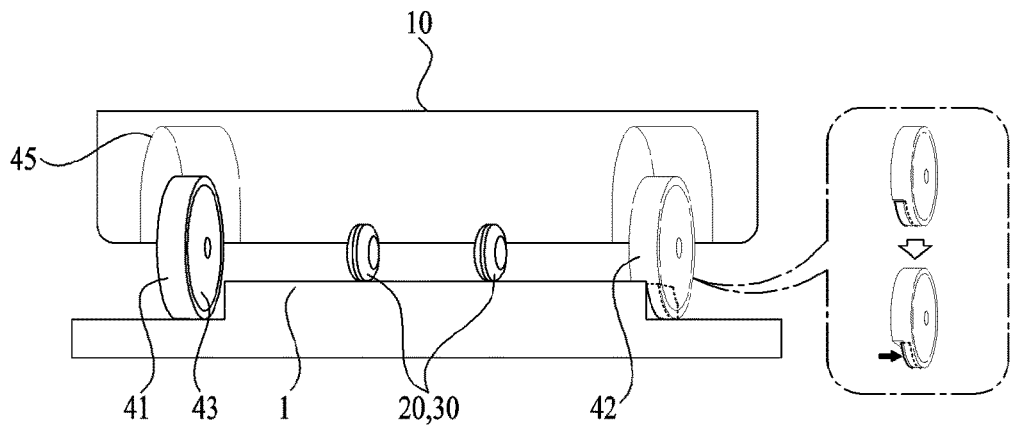
[Fig. 8]
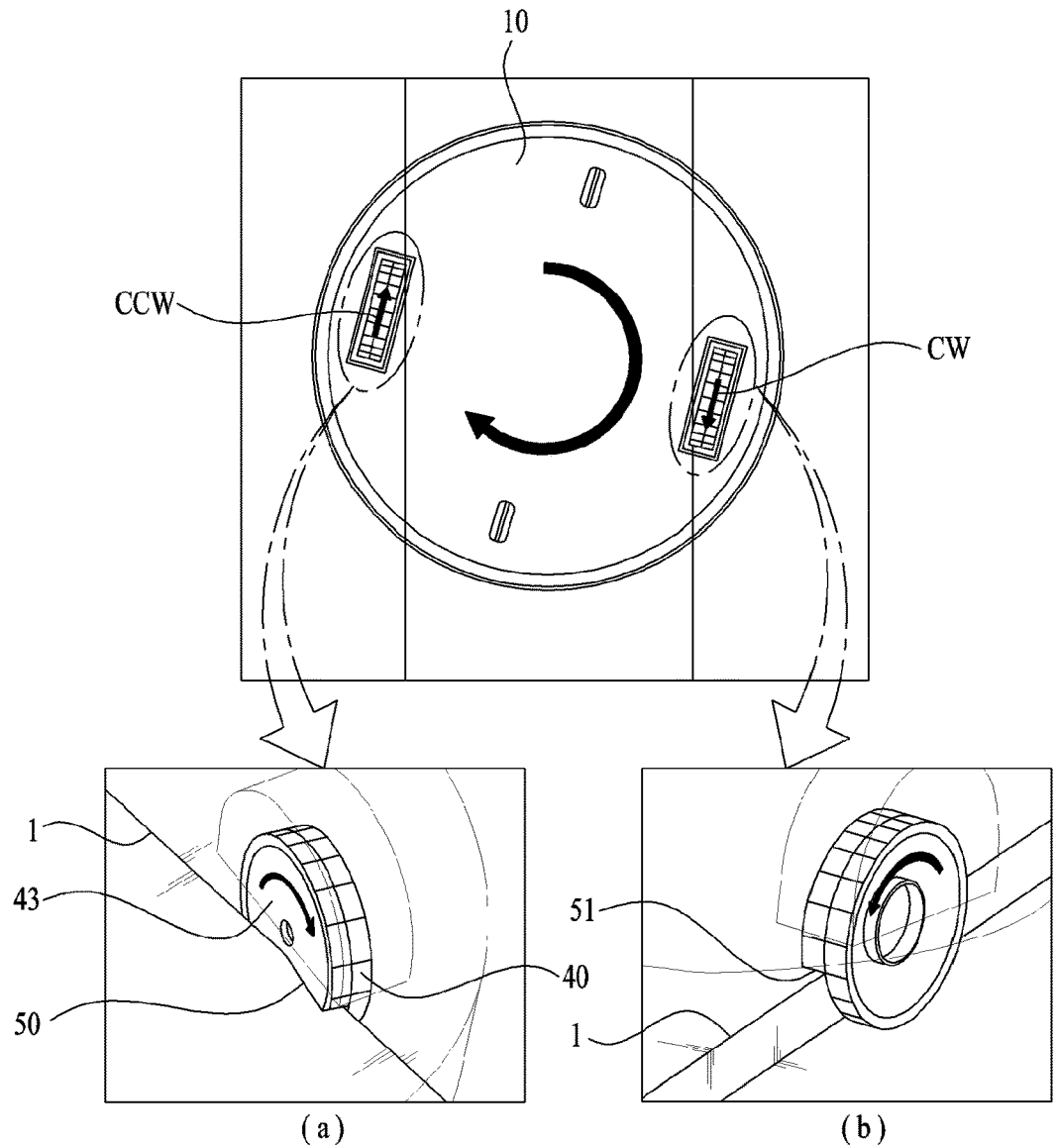

ROBOT CLEANER

CROSS-REFERENCE TO RELATED PATENT APPLICATIONS

This application is a U.S. National Stage Application under 35 U.S.C. § 371 of PCT Application No. PCT/KR2019/012923, filed Oct. 2, 2019, whose entire disclosures are hereby incorporated by reference.

TECHNICAL FIELD

Embodiments of the present disclosure relate to a robot cleaner configured to perform cleaning by sucking dust, dirt and foreign substances while running on the floor automatically.

BACKGROUND ART

Generally, a vacuum cleaner includes a body having a suction device and a dust canister; and a cleaner nozzle used in cleaning the floor in a state of being adjacent to the floor that is a cleaning object.

The vacuum cleaner is categorized into a hand-operated cleaner used by a user in cleaning the floor with the hand and a robot cleaner configured to perform cleaning while running on the floor automatically.

In the hand-operated cleaner, the suction device is actuated to generate a suction force by using a driving force of an electric motor and the user puts the cleaner nozzle or the body on the floor, in a state of holding the body. In this instance, the cleaner nozzle sucks first and foreign substances from the floor by means of the suction force and the sucked foreign substances are collected in the dust canister to perform cleaning.

The robot cleaner is configured to suck dust and other foreign substances from the floor while running in an area desired to clean automatically. In other words, the robot cleaner may perform cleaning for a predetermined area automatically. For that, the robot cleaner includes a distance sensor configured to sense a distance to an obstacle installed in a cleaning area (e.g., furniture, office tools, wall or the like); and right and left wheels for the movement of the robot cleaner. Here, the right and left wheels may be configured to be rotated by right and left motors such that the rotor cleaner can perform cleaning, while robot cleaner is changing its direction automatically according to according to the drive of the right and left motors.

In addition, a suction nozzle is provided in a lower portion of the robot cleaner and configured to suck foreign substances from the floor. The suction nozzle may include a nozzle case fixed to the cleaner body not to move; a suction hole formed in a bottom of the nozzle case and configured to suck the foreign substances; and an agitator rotatably coupled to the suction hole and configured to lift the foreign substances including dust that are stuck on the floor to the suction hole.

When the height of the obstacle such as a threshold existing in the cleaning area is larger than the preset height determined to allow the robot cleaner to climb up, the wheels of the cleaner body could fail to run over the obstacle disadvantageously and then the robot cleaner is likely to be trapped.

While the robot cleaner is trapped, the wheels are caught at the obstacle and the motor is being rotated continuously. Accordingly, the wheels might damage or the battery provided in the robot cleaner might be consumed faster.

Korean Patent Open Paid No. 10-2014-0067705 (published on 5th day of Jun., 2014, hereinafter, Cited Reference) discloses a moving auxiliary device 200 for running over an obstacle such as a threshold, the moving auxiliary device 200 include a second drive unit 210, a moving member 230 supplied electric power by the second drive unit 210, a power transmission unit 220 provided to transfer the power of the second drive unit 210 to the moving member 230, and a housing 201 for accommodating the power transmission unit 220.

Specifically, the cited reference is a swing suspension type which requires an ad-ditional motor and an additional sensor configured to sense that the wheels of the robot cleaner are caught (or the wheels are lifted from the floor), such that it may require ad-ditional control method configured to be driven after the caught state of the wheels. Accordingly, the cited reference has disadvantages of complex technical features and structure.

DISCLOSURE OF INVENTION

Technical Problem

To overcome the disadvantages, an object of the present invention is to address the above-noted and other problems.

Another object of the present disclosure is to provide a robot cleaner including an escaping unit formed in an inner surface of a wheel configured to run over a threshold and a protrusion, without additional structures, when a body of the robot cleaner is trapped by a threshold and a protrusion not to run over them.

A further object of the present disclosure is to provide a structure configured to contact with the threshold and protrusion by means of the rotation of a wheel, without any additional motor for escape a trapped state of the robot cleaner.

A still further object of the present disclosure is to provide a structure of a robot cleaner configured not to be interfered with by the running of the cleaner and to run over the threshold only when the escaping unit formed in the inner surface of the wheel contacts with the threshold.

Solution to Problem

To achieve these objects and other advantages and in accordance with the purpose of the embodiments, as embodied and broadly described herein, a robot cleaner comprises an escaping unit provided in an inner surface of a wheel. When the robot cleaner is caught and trapped by a threshold, right and left wheels of the robot cleaner may be rotated in different directions and the escaping units may run over the threshold in contact.

The inner surfaces of the wheels may contact with the threshold and be pushed in a lateral direction such that the escaping units can run over the threshold.

Embodiments of the present disclosure may provide a robot cleaner comprising a body; and wheels provided in both lower sides of the body and configured to move the body, wherein each of the wheels comprises an inner surface directed towards an inside of the body; an outer surface provided in opposite to the inner surface; and an escaping unit provided in the inner surface and configured to contact with a protrusion, and as the wheels are rotated, the escaping unit is caught in the protrusion and the wheels run over the protrusion.

The escaping unit may be projected from some area of the inner surface and forms a step. The escaping unit may be tilted from the step along a rotational direction of the wheels. The wheels may comprise a first wheel provided in one side of the body; and a second wheel provided in opposite to the first wheel, and the escaping units provided in the inner surfaces of the first and second wheels are in symmetry. When the protrusion is located between the first wheel and the second wheel, the first and second wheels may be rotated in different directions and run over the protrusion.

The escaping unit may be recessed from some area of the inner surface and form a step. The escaping unit may be tilted from the step along a rotational direction of the wheels. The wheels may comprise a first wheel provided in one side of the body; and a second wheel provided in opposite to the first wheel, and the escaping units provided in the inner surfaces of the first and second wheels are in symmetry. When the protrusion is located between the first wheel and the second wheel, the first and second wheels may be rotated in different directions and run over the protrusion.

The escaping unit may comprise a recessed portion recessed from some area of the inner surface and forming a step; and a variable member provided in the recessed portion and elastically supported. The recessed portion may be tilted from the step along a rotational direction of the wheels. The variable member may comprise a hinge part rotatably connected to one side of the recessed portion; and a pressed portion elastically supported from the other side of the recessed portion along with the rotation of the hinge part.

The recessed portion may be tilted from one side to the other side towards the outer surface.

The escaping unit may further comprise a flexible member provided in the other side of the recessed portion and elastically supporting the pressed portion. The variable member may further comprise a restricting member projected from one side and re-stricting a range of location change of the pressed portion facilitated by the flexible member.

The wheels may comprise a first wheel provided in one side of the body; and a second wheel provided in opposite to the first wheel, and the escaping units provided in the inner surfaces of the first and second wheels may be in symmetry. When the protrusion is located between the first wheel and the second wheel, the first and second wheels may be rotated in different directions and run over the protrusion.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Advantageous Effects of Invention

Accordingly, the embodiments have following advantageous effects. According to the embodiments of the present disclosure, the robot cleaner may include an escaping unit formed in an inner surface of a wheel configured to run over a threshold and a protrusion, without additional structures, when a body of the robot cleaner is trapped by a threshold and a protrusion not to run over them.

Furthermore, the structure may be configured to contact with the threshold and protrusion by means of the rotation of a wheel, without any additional motor for escape a trapped state of the robot cleaner.

Still further, the structure of a robot cleaner may be configured not to be interfered with by the running of the cleaner and to run over the threshold only when the escaping unit formed in the inner surface of the wheel contacts with the threshold.

BRIEF DESCRIPTION OF DRAWINGS

FIG. 1 is a diagram illustrating a lower surface of a robot cleaner according to one embodiment of the present disclosure;

FIG. 2 is a diagram illustrating a wheel of the robot cleaner according to one em-bodiment;

FIG. 3 is a diagram illustrating a wheel of a robot cleaner according to another em-bodiment of the present disclosure;

FIG. 4 is a diagram illustrating one example of trapped state escaping of the robot cleaner shown in FIG. 3;

FIG. 5 is a diagram illustrating a wheel of a robot cleaner according to a further em-bodiment of the present disclosure;

FIG. 6 is a diagram illustrating a connection relation of a variable member shown in FIG. 5;

FIG. 7 is a diagram illustrating one example of a robot cleaner to which the wheel shown in FIG. 5 is applied; and FIG. 8 is a diagram illustrating one example of trapped state escaping of the robot cleaner to which the wheel shown in FIG. 5 is applied.

Mode for the Invention

Reference will now be made in detail to the preferred embodiments of the present invention, examples of which are illustrated in the accompanying drawings. All terms disclosed in this specification correspond to general terms understood by persons having ordinary skill in the art to which the present invention pertains unless the terms are specially defined. If the terms disclosed in this specification conflict with general terms, the terms may be understood on the basis of their meanings as used in this spec-ification.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In the present disclosure, that which is well-known to one of ordinary skill in the relevant art has generally been omitted for the sake of brevity. The accompanying drawings are used to help easily understand various technical features and it should be understood that the embodiments presented herein are not limited by the ac-companying drawings. As such, the present disclosure should be construed to extend to any alterations, equivalents and substitutes in addition to those which are particularly set out in the accompanying drawings. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

It will be understood that although the terms first, second, A, B, (a), (b), etc. may be used herein to describe various elements, these elements should not be limited by these terms. These terms are generally only used to distinguish one element from another.

FIG. 1 is a diagram illustrating a lower surface of a robot cleaner according to one embodiment of the present disclosure. Hereinafter, referring to FIG. 1, the embodiment will be described.

The robot cleaner according to this embodiment may include a body 10 defining an exterior design; a wheel 40 coupled to the body 10 and configured to rotate to move or rotate the body 10 back and forth; and a front auxiliary wheel 20 supporting one side of the body 10 and assisting the rotation of the body 10 facilitated by the wheel 40.

The wheel 40 may include right and left wheels independently provided in right and left sides of the body 10 and configured to be independently driven.

When the body 10 is running forwardly and backwardly, the wheels 40 may be rotated in the same direction. When the body 10 is rotated, the wheels 40 may be rotated in different directions.

The rotation of the body 10 may be performed to change the running direction of the robot cleaner. As one example, when the body 10 is blocked by a high obstacle not to run forwardly, the case 10 may be rotated to change the running direction.

Meanwhile, the body 10 may include a suction unit 14 configured to suck foreign substances; and a tilted unit 12 configured to guide the body 10 when the body 10 is running over a step. The tilted unit 12 may be formed in a front lower end of the case 10 and it may mean a tilted part.

The suction unit 14 may include an agitator provided in the body 10 and configured to contact with the floor on which cleaning is performed; and a suction hole formed in the body 10 and configured to suck external foreign substances by means of a suction force generated in the body 10.

The tilted unit 12 may be arranged in a front end of the body 10 and the auxiliary wheel 20 may be arranged behind the tilted unit 12. The wheels 40 may be arranged behind the front auxiliary wheel 20.

Meanwhile, a rear auxiliary wheel 30 may be provided behind the wheels 40 to support the other side of the body 10.

The front auxiliary wheel 20 and the rear auxiliary wheel 30 may freely rotate with respect to the body 10 in a horizontal direction. The front auxiliary wheel 20 and the rear auxiliary wheel 30 may be fixedly coupled to the body 10 at a preset height.

Meanwhile, the wheels 40 may be configured of two wheels. The two wheels may be rotated at different speeds or in different directions so as to rotate the body 10 leftwards or rightwards.

Especially, the wheels 40 may have a variable height with respect to the body 10, different from the front auxiliary wheel 20 having the fixed height.

FIG. 2 is a diagram illustrating a wheel of the robot cleaner according to one em-bodiment. Hereinafter, the wheel will be described referring to FIG. 2.

The robot cleaner according to the present embodiment may include wheels 40 provided in both lower sides of the body 10, respectively, and configured to move the body 10. The wheel 40 may include an inner surface 43 directed towards the inside of the body 10; an outer surface 44 provided in opposite to the inner surface 43; and an escaping unit 50 provided in the inner surface 43 and configured to contact with a protrusion. As the wheels 40 are rotated, the escaping unit 50 may be caught in the protrusion and the wheels 40 may run over the protrusion.

The inside of the body 10 means an inside of an exterior design of the robot cleaner defined by the body 10. The wheels 40 may be provided in both sides of the body 10, respectively, such that the inner surfaces 43 of the wheels 40 may be directed towards the inside of the body 10 and the outer surfaces 44 of the wheels 40 may be directed towards the outer area of the body 10.

The escaping unit 50 may be provided in the inner surface 43, specifically, projected from some are of the inner surface 43 while forming a step 51. The escaping unit 50 may be tilted along a rotational direction of the wheels 40 from the step 51.

Specifically, the escaping unit 50 may be projected from the inner surface 43 while forming the step 51. The step 51 may be formed from an inner circumferential surface to an outer circumferential surface of the wheel 40.

If the body 20 is caught in a protrusion such as a threshold, the step 51 may be caught in the protrusion as the wheels 40 are rotated and the wheels 40 may run over the protrusion. Accordingly, the step 51 may be formed from the inner circumferential surface to the outer circumferential surface of the wheel 40 so as to maximize a contact area with the protrusion.

If the escaping unit is simply projected from the inner surface of the wheel, the wheels supported by the escaping unit cannot run over and might be idling.

Meanwhile, the escaping unit 50 may be tilted from the step 51 along the rotational direction of the wheels 40. Specifically, the single step 51 may be formed in the inner surface of the wheel 40 and the escaping unit 50 may form the step 51 in some area of the inner surface of the wheel 40 to be tilted from the step 51 downwardly while forming a plane with the inner surface 43 of the wheel.

Specifically, the escaping unit 50 may form the largest height h1 at the step 51 and be tilted downwards along the rotational direction of the wheels to form the same height h2 with the width of the wheel.

The rotational direction of the wheel may mean a rotational direction of the robot cleaner moving forwards.

Accordingly, when the robot cleaner is running on the floor, the step 51 may be prevented from being caught in an obstacle of the floor. When the robot cleaner is trapped, the wheels may be rotated in different directions and the protrusion such as the threshold may be caught in the step 51, only to run over the protrusion.

FIG. 3 is a diagram illustrating a wheel of a robot cleaner according to another em-bodiment of the present disclosure. Referring to FIG. 3, the wheel will be described and repeated description will be omitted.

The escaping unit 50 of the present embodiment may be recessed while forming the step 51 in some area of the inner surface 43 of the wheel 40 and tilted along the ro-tational direction of the wheels 40.

Specifically, the escaping unit 50 may be recessed and form the step 51 in the inner surface 43. The step 51 may be formed from the inner circumferential surface to the outer circumferential surface of the wheel 40.

The step 51 may be formed while the escaping unit 50 is recessed from the inner surface 43 of the wheels 40. The step 51 of the escaping unit 50 may have the same height h1 with the width of the wheels 40 and be tilted downwards along the rotational direction of the wheel to have a smaller height than the width of the wheels.

FIG. 4 is a diagram illustrating one example of trapped state escaping of the robot cleaner shown in FIG. 3. Referring to FIG. 4, the example will be described.

Referring to FIG. 4, the wheels according to the present embodiment may include a first wheel 41 provided in one side of the body 10; and a second wheel 42 provided in opposite to the first wheel 41. The escaping unit 50 may be symmetrically provided each inner surface of the first and second wheels 41 and 42.

When a protrusion 1 is provided between the first and second wheels 41 and 42, the first and second wheels 41 and 42 may be rotated in different directions and run over the protrusion 1.

As mentioned above, the wheels 41 and 42 may be both right and left sides of the body 10 provided in the robot cleaner, respectively, and the wheels 41 and 42 may be provided in opposite to each other for running safety. Accordingly, the inner surfaces 43 of the wheels 41 and 42 may be directed towards the inside of the body 10 such that they can face each other.

The escaping unit 50 may be provided in each inner surface 43 of the wheels and the escaping units 50 may be provided in symmetry. The terminology of being provided in symmetry may mean that the shapes of the escaping unit 50 tilted from the step 51 along the rotational direction of the wheels may be in symmetry.

If the slopes of the escaping units 50 are formed in the reversed directions, the step might be caught in the obstacle located on the floor during the running of the robot cleaner only to deteriorate the linear running ability of the robot cleaner. Because of that, the escaping units 50 may be provided in symmetry and the slopes of the escaping units 50 formed in the inner surfaces of the wheels 41 and 42 may be formed along the rotational direction of the wheels.

Meanwhile, the running of the robot cleaner is likely to be trapped by the protrusion 1. In this instance, the body 10 may be caught in the protrusion 1 and the wheels 41 and 42 may be moved downwards with respect to the body 10 to cause a wheel moving out.\

Specifically, the wheels 41 and 42 may be provided in wheel mounting portions 45 and a flexible member 47 may be provided in each of the wheel mounting portions 45 to connect the wheel mounting portions 45 with the wheels 41 and 42. Accordingly, when the body 10 is caught in the protrusion 1, the wheels 41 and 42 may be moved downwards along the direction of the gravity and some areas of the wheels may escape from the body 10 such that the wheels cannot generate the sufficient contact friction for moving the body enough to put the robot cleaner in the trapped state.

Accordingly, the body 10 cannot move in the trapped state even when the wheels are rotated, and the robot cleaner cannot run.

According to the present embodiment, the body 10 may not run over the protrusion 1 1 but be caught in the protrusion 1 to place the robot cleaner in the trapped state, the wheels 41 and 42 may be rotated in different directions.

Referring to FIG. 4 (b), to escape from the trapped state, the robot cleaner may control the first wheel 41 to be rotated in a counter-clockwise direction CCW and the second wheel 42 to be rotated in a clockwise direction CW such that the step 51 of the escaping unit 50 may be caught in the protrusion 1. The wheels 41 and 42 may run over the protrusion 1 to rotate the body 10 and the robot cleaner may escape from the trapped state.

Such the control mentioned above may be applied equally with the conventional control method of the robot cleaner. As one example, when the robot cleaner meets an obstacle that cannot be run over, the control method for controlling the two wheels to be rotated in different directions so as to change the running route may be applied.

In other words, when the robot cleaner is in a state where it cannot run any farther, the wheels provided in both sides of the robot cleaner are rotated in the different di-rections to change the running route. Similar to that, when the robot cleaner is in the state where it cannot run any farther according to this embodiment, the wheels of the robot cleaner may be also rotated in the different directions so as to escape the trapped state.

FIG. 5 is a diagram illustrating a wheel of a robot cleaner according to a further em-bodiment of the present disclosure and FIG. 6 is a diagram illustrating a connection relation of a variable member shown in FIG. 5. Hereinafter, the embodiment will be described referring to FIGS. 5 and 6.

The escaping unit 50 according to the present embodiment may include a recessed portion 53 recessed from some area of the inner surface 43 while forming the step 51; and a variable member 60 provided in the recessed portion 53 and elastically supported.

The recessed portion 53 may be tilted from the step 51 along the rotational direction of the wheels 40. The variable member 60 may include a hinge part 61 rotatably connected to one side of the recessed portion 53; and a pressed portion 63 pressed from the other side of the recessed portion 53 and elastically supported along with the rotation of the hinge part 61.

Specifically, the recessed portion 53 may form a slope towards the outer surface 44 of the wheel from one side to the other side. The slope may be formed along the ro-tational direction of the wheel as mentioned above. In other words, the recessed portion 53 may be equal to the escaping unit 50 described referring to FIG. 3.

The escaping unit 50 of the present embodiment may have the step 51 formed while the variable member 60 provided in the recessed portion 53 is pressed by the external shock applied to the inner surfaces 43 of the wheels in a lateral direction.

As mentioned above, the escaping unit is formed in a shape that is recessed from the step formed in the inner surface of the wheel along the rotational direction of the wheels. Even if the elements interfering with the running when the escaping unit is formed in a recessed shape from the step formed in the inner surface of the wheel along the rotational direction of the wheels while the robot cleaner is running, the being caught in an unexpected obstacle by the recessed shape .

Accordingly, the variable member 60 is provided in the recessed portion 53 according to this embodiment and the step 51 may be caught in the protrusion 1 as the variable member 60 is pressed in the lateral direction.

The variable member 60 may be rotatable on the hinge part 61 and the hinge part 61 includes a projection 511. The hinge part 61 may be secured by forcedly fitting the pro-jection 611 in a groove formed in one side of the recessed portion 53.

The variable member 60 may be provided in a preset shape having a thickness that gets thicker along the rota-tional direction of the wheels. The thickness of the pressed portion 63 may be larger than that of the hinge part 61. That is because the recessed portion is recessed along a radial direction of the wheels while forming the slope. Ac-cordingly, it is preferred that the variable member 60 provided in the recessed portion 53 forms a flat surface with the inner surface 43 of the wheel.

The pressed portion 63 may be elastically supported by the other side of the recessed portion 53 along with the rotation of the hinge part 61 and the recessed portion 53 may include a flexible member 55 provided to elastically support the pressed portion 63. Here, the flexible member 55 may be provided in the other side of the recessed portion 53.

In addition, the variable member 60 may include a restricting member 631 projected from one side of the variable member 60 and configured to restrict a range of the position change of the pressed portion 63. The restricting member 631 may be hooked in a groove formed in the other side of the recessed portion 53.

If the power is consistently applied to the pressed portion 63 in a direction towards the inner surface of the wheel by the flexible member 55, the pressed portion 63 might be projected from the inner surface 43 of the wheel. Because of that, the range of the position change of the pressed portion 63 may be restricted by the restricting member 631 such that the variable member 60 can form the flat surface with the inner surface 43 of the wheel.

In other words, the inner surface of the wheel may be kept flat by the structure of the escaping unit 50 mentioned above, while the robot cleaner is running, and the robot cleaner may be prevented from being caught in the obstacle. If the robot cleaner is in the trapped state, the protrusion may be pressed by the escaping unit and caught in the step of the escaping unit such that the wheels may run over the protrusion to escape the robot cleaner from the trapped state.

FIG. 7 is a diagram illustrating one example of a robot cleaner to which the wheel shown in FIG. 5 is applied. FIG. 8 is a diagram illustrating one example of trapped state escaping of the robot cleaner to which the wheel shown in FIG. 5 is applied. Hereinafter, referring to FIGS. 7 and 8, the embodiment will be described and repeated description will be omitted.

When the body 10 is caught in the protrusion 1 and the robot cleaner is in the trapped state, the first and second wheels 41 and 42 may be rotated in different directions to rotate the body 10. At this time, the escaping units 50 provided in the positions provided in the inner surfaces of the first and second wheels 41 and 42 in symmetry with each other may contact with the protrusion 1 and the variable member 60 may be pressed. While the variable member 60 is pressed, the step 51 of the escaping unit 50 may be caught in the protrusion 1 and the wheels 40 may run over the protrusion 1 to escape the robot cleaner from the trapped state.

As mentioned above, when the wheels 41 and 42 are moved out from the body by the body 10 caught in the protrusion 1, it is impossible to generate the sufficient contact friction for moving the body with respect to the floor even once the wheels 41 and 42 are rotated. Accordingly, the wheels 41 and 42 may be configured to run over the protrusion 1 to be located at the original positions and generate the sufficient contact friction for moving the body 10.

Referring to FIG. 8, the first and second wheels may be rotated in the clockwise CW and counter-clockwise CCW directions, respectively. Hence, the inner surfaces of the wheels may contact with the protrusion 1 and the variable member 60 may be pressed such that the step 51 may be caught in the protrusion 1. Accordingly, the body 10 may run over the protrusion 1 while being rotated on an axis that is vertical with respect to the ground so as to escape the robot cleaner from the trapped state.

As the present features may be embodied in several forms without departing from the characteristics thereof, it should also be understood that the above-described em-bodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A robot cleaner comprising:
   a body; and
   wheels provided in both lower sides of the body and configured to move the body,
   wherein each of the wheels comprises,
   an inner surface directed towards an inside of the body;
   an outer surface provided in opposite to the inner surface; and
   an escaping unit provided in the inner surface and configured to contact with a protrusion, and
   as the wheels are rotated, the escaping unit is caught in the protrusion and the wheels run over the protrusion,
   wherein the escaping unit, which is projected from some area of the inner surface and forms a step, is tilted from the step along a rotational direction of the wheels.

2. The robot cleaner of claim 1, wherein the wheels comprise,
   a first wheel provided in one side of the body; and
   a second wheel provided in opposite to the first wheel, and the escaping units provided in the inner surfaces of the first and second wheels are in symmetry.

3. The robot cleaner of claim 2, wherein when the protrusion is located between the first wheel and the second wheel, the first and second wheels are rotated in different directions and run over the protrusion.

4. The robot cleaner of claim 1 wherein the escaping unit is recessed from some area of the inner surface and form a step.

5. The robot cleaner of claim 4, wherein the escaping unit is tilted from the step along a rotational direction of the wheels.

6. The robot cleaner of claim 5 wherein the wheels comprise,
   a first wheel provided in one side of the body; and
   a second wheel provided in opposite to the first wheel, and the escaping units provided in the inner surfaces of the first and second wheels are in symmetry.

7. The robot cleaner of claim 6, wherein when the protrusion is located between the first wheel and the second wheel, the first and second wheels are rotated in different directions and run over the protrusion.

8. The robot cleaner of claim 1 wherein the escaping unit comprises,
   a recessed portion recessed from some area of the inner surface and forming a step; and
   a variable member provided in the recessed portion and elastically supported.

9. The robot cleaner of claim 8, wherein the recessed portion is tilted from the step along a rotational direction of the wheels.

10. The robot cleaner of claim 9 wherein the variable member comprises,
    a hinge part rotatably connected to one side of the recessed portion; and
    a pressed portion elastically supported from the other side of the recessed portion along with the rotation of the hinge part.

11. The robot cleaner of claim 10, wherein the recessed portion is tilted from one side to the other side towards the outer surface.

12. The robot cleaner of claim 10, wherein the escaping unit further comprises a flexible member provided in the other side of the recessed portion and elastically supporting the pressed portion.

13. The robot cleaner of claim 12, wherein the variable member further comprises a restricting member projected from one side and restricting a range of location change of the pressed portion facilitated by the flexible member.

14. The robot cleaner of claim 8, wherein the wheels comprise,
 a first wheel provided in one side of the body; and
 a second wheel provided in opposite to the first wheel, and the escaping units provided in the inner surfaces of the first and second wheels are in symmetry.

15. The robot cleaner of claim 14, wherein when the protrusion is located between the first wheel and the second wheel, the first and second wheels are rotated in different directions and run over the protrusion.

\* \* \* \* \*